United States Patent Office 3,288,091
Patented Nov. 29, 1966

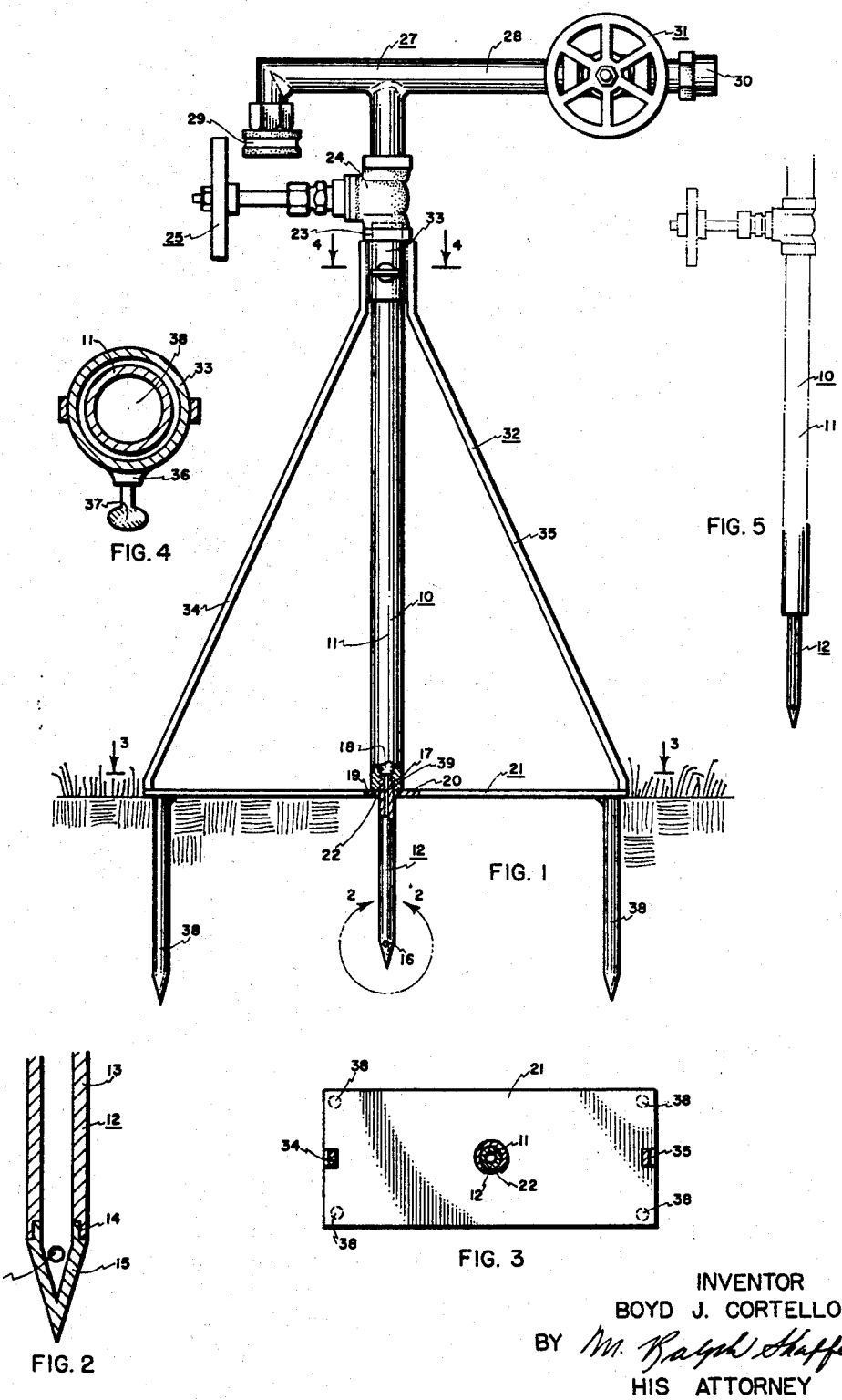

3,288,091
WATERING DEVICE
Boyd J. Cortello, 289 E. Vine St., Murray, Utah
Filed Jan. 28, 1965, Ser. No. 428,773
3 Claims. (Cl. 111—7)

The present invention relates to watering devices and, more particularly, to a new and improved watering device which is capable of watering both sod, grass, flower beds, fruit trees, and other areas such as nursery cans, hot house plants, and other horticultural items.

Accordingly, a principal object of the present invention is to provide a new and improved watering device or soaker for horticultural uses.

An additional object is to provide a watering device wherein the same is provided with means suitable to keep water flowing from the device within the sod or other area in which the liquid of the device is being introduced.

An additional object is to provide positioning means for probe-like soaking devices which serve not only to facilitate sod penetration and stationary erection of the device, but also keep water flowing from the device completely thereunder, thereby insuring that the sod or other area which is being penetrated by the device will receive the full benefit of the liquid introduced therein.

An additional object is to provide a prong-equipped, foot plate for lawn soakers, this so as to aid erection of the device over sod to be treated and likewise provide that liquid coming from the device will be retained in the sod so penetrated.

An additional object is to provide a watering device wherein support structure may be conveniently removed therefrom in order to accommodate the same for deep-hole probe penetration of desired soil or other objects.

An additional object is to provide a device a series of which may be conveniently inserted in series in a water-line to provide multiple area soaking thereby.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing in which:

FIGURE 1 is a side elevation of the watering device of the present invention.

FIGURE 2 is an enlarged, fragmentary, sectioned view taken along the line 2—2 in FIGURE 1.

FIGURE 3 is a plan view of the device of FIGURE 1 and is taken along the line 3—3 therein, being shown partially in section.

FIGURE 4 is an enlarged section taken along the line 4—4 in FIGURE 1.

FIGURE 5 is a side elevation, shown in reduced scale, of a portion of the device of the present invention wherein the same is used simply as a deep-hole type watering probe, the support structure thereof being preliminarily removed.

In FIGURE 1 the watering device of the present invention is shown to include an elongate watering means or conduit 10 which is comprised of an extension conduit 11 and a conductive, watering probe 12. The watering probe 12 comprises a tubular conduit 13 having a shouldered extremity 14 into which is pressed or otherwise fitted a tip 15. Either the tip 15 or the tube 13, or both, will have suitable aperture means 16 (comprising one or more perforations) so as to constitute the probe 12 as a conductive probe adapted to carry liquid from above to the sod or other material in which the probe is placed. Upper extremity 17 of probe 12 is exteriorly threaded, as shown in FIGURE 1, and is threaded into the interiorly-threaded portion 18 of extension conduit 11. Preferably, and for reasons hereinafter explained, the extension conduit 11 with probe 12 conjointly form a shoulder 19 designed to abut the upper surface 20 of foot plate 21. This is so that pressure exerted from above upon the extension conduit 11 will serve to depress foot plate 21, this in conjunction with any foot pressure likewise exerted upon foot plate 21. The aperture 22 disposed within foot plate 21 is provided for access of the probe 12 therethrough.

The upper extremity 23 of extension conduit 11 is preferably threaded and inserted into T 24 of valve 25. Correspondingly, the central leg 26 of T-configured conduit 27 is threaded into the valve T 24 in a conventional manner. T-configured conduit 27 includes a top conduit portion 28 provided with an inlet connection 29 and a branch connection 30. Valve 31 may be interposed in the T-configured conduit 27 so that the branch connection may be shut off and turned on as desired.

Foot plate 21 is a part of the over-all support structure 32, the latter also being comprised of slide collar 33 and brace members 34 and 35. Brace members 34 and 35 are affixed to and between collar 33 and foot plate 21 by welding or other suitable means. Preferably, two or more brace members 34 and 35 are supplied, see FIGURE 3. Also included, as shown in FIGURES 1 and 4, is a set screw receiving boss 36, formed integrally with collar 33, and including set screw 37 which threads therein and abuts the extension conduit 11. Inner passageway 38 of the extension conduit 11 communicates with passageway 39 of probe 12 so that a direct, water connection is maintained through inlet 29 and valve T 24, through the elongate watering means 10 to the sod in which the conductive watering probe 12 is placed.

The operation of the structure is as follows. Shut-off valve 31 will be normally closed unless branch connections are supplied to connection 30. An inlet hose or other conduit is attached to inlet connection 29 in FIGURE 1 of the drawings. When it is desired that sod be watered, the valve 25 will be manually closed, set screw 37 tightened, and the operator will push down with his hand on the T-configured conduit 27 and push the plate 31 with his foot or feet in order that prongs 38, welded or otherwise secured to foot plate 31, may penetrate the sod in conjunction with sod penetration of probe 12. When the foot plate is thoroughly in place so that the same rests upon the sod or other material, then valve 25 is turned off so as to allow the water pressure of liquid communicating through connection 29 to proceed downwardly through elongate watering means 10, through probe 12 into the sod in the immediate area of probe 12. It will be noted that foot plate 21 serves not only to maintain the structure in a supported position, and keep it on the ground, but also keeps fluid from coming up the sides of probe 12 to gush out of the top of the sod; rather, the foot plate confines water proceeding out of aperture 16 to sod areas beneath plate 21. It will be noted that, as heretofore explained, foot plate implacement is attained not only by foot pressure upon the plate 21 but likewise by manual pressure upon conduit 27 pushing downwardly and causing shoulder 19 to coact in an abutting fashion with the upper surface 20 of foot plate 21.

It is likewise to be noted that the support structure 23 may be completely removed from the assembly by the mere loosening of set screw 37 and the sliding downwardly of collar 33 along elongate watering means 10 until the same passes the lowermost extremity of probe 12. In such event the device can be then used simply as a deep-hole probe or watering device as shown in FIGURE 5. The latter configuration would be ideally suited for watering trees, flowers, and other shrubbery that may be growing in cans, barrels, or tins. Of course, it is conceivable that the structure will be manufactured as a unitary device and intended primarily for lawn or sod watering as in the configurement shown in FIGURE 1. However, it is deemed preferable, and novel, that the support structure 32 may optionally be removed so that a deep-hole probe watering device is provided.

Additional structures may be supplied in series and an inlet hose connected to branch connection 30, as desired.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A watering device including, in combination, a depending, elongate watering means including a conductive, watering probe; and support structure releasably secured to said elongate watering means, said support structure including depending prong means constructed and arranged for sod insertion, and wherein said support structure includes a foot plate, said depending prong means being integral with and depending from said foot plate, and wherein said support structure includes a collar circumscribing said elongate watering means, and brace means secured to and between said collar and said foot plate.

2. A watering device according to claim 1 wherein said collar includes set screw means for selectively engaging said elongate watering means.

3. A watering device including, in combination, a depending, elongate watering means including a conductive, watering probe; and support structure releasably secured to said elongate watering means, said support structure including depending prong means constructed and arranged for sod insertion, and wherein said support structure includes a foot plate, said depending prong means being integral with and depending from said foot plate, and wherein said foot plate includes an aperture, said elongate watering means comprising an elongate extension conduit integral with said watering probe, the construction of said extension conduit and said watering probe forming a downwardly-facing shoulder construction to abut said foot plate about said aperture, said conductive, watering probe being constructed to pass through said aperture and depend beneath said foot plate.

References Cited by the Examiner
UNITED STATES PATENTS

| 1,525,571 | 2/1925 | Cypert | 111—6 X |
| 1,979,541 | 11/1934 | Gunn | 111—7.1 |
| 2,173,966 | 9/1939 | Jackson | 111—7.2 |
| 2,902,953 | 9/1959 | Young | 111—7.1 |
| 3,091,197 | 5/1963 | Henry | 111—7.1 |
| 3,142,273 | 7/1964 | Dilts | 111—7.1 |

ABRAHAM G. STONE, *Primary Examiner.*

R. E. BAGWILL, *Assistant Examiner.*